(12) United States Patent
Joseph et al.

(10) Patent No.: US 6,338,123 B2
(45) Date of Patent: Jan. 8, 2002

(54) COMPLETE AND CONCISE REMOTE (CCR) DIRECTORY

(75) Inventors: Douglas J. Joseph; Maged M. Michael, both of Danbury, CT (US); Ashwini Nanda, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,787

(22) Filed: Mar. 31, 1999

(51) Int. Cl.[7] .............................................. G06F 12/00
(52) U.S. Cl. ........................ 711/144; 711/130; 711/156
(58) Field of Search ................................ 711/130, 156, 711/144

(56) References Cited

U.S. PATENT DOCUMENTS 5,802,578 A * 9/1998 Lovett ........................ 711/147

* cited by examiner

*Primary Examiner*—Jack A. Lane
(74) *Attorney, Agent, or Firm*—McGinn & Gibb, PLLC; Robert P. Tassinari, Esq.

(57) ABSTRACT

A method and structure for a system for maintaining coherence of cache lines in a shared memory multiplexor system comprises a system area network and a plurality of compute nodes connected to the system area network. Each of the computer nodes includes a local main memory, a local shared cache and a local coherence controller and computer nodes external to a given compute node include external shared caches and the coherence controller includes shadow directories, each corresponding to one of the external shared caches. Each of the shadow directories includes state information of the local main memory cached in the external shared caches. The shadow directories include only state information of the local main memory cached in the external shared caches.

16 Claims, 2 Drawing Sheets

CCR DIRECTORY

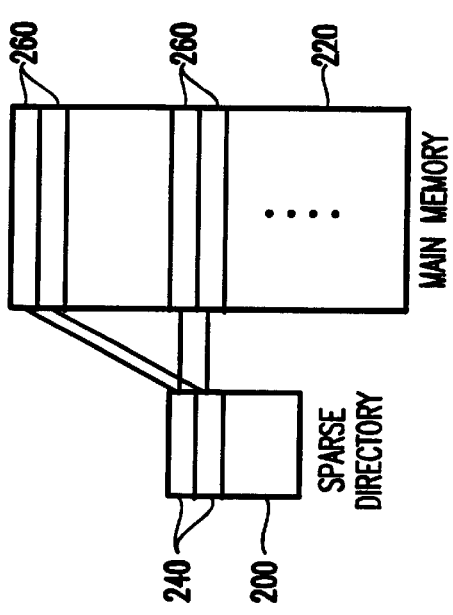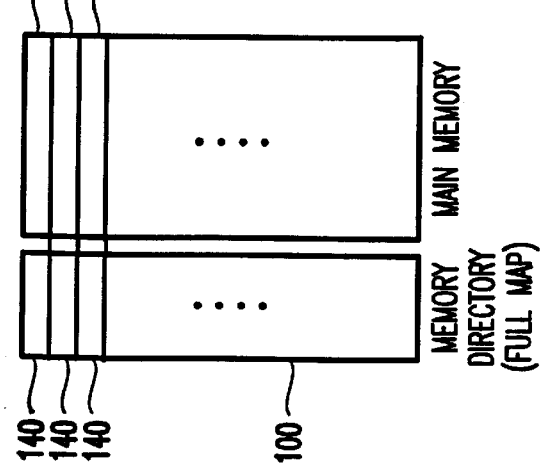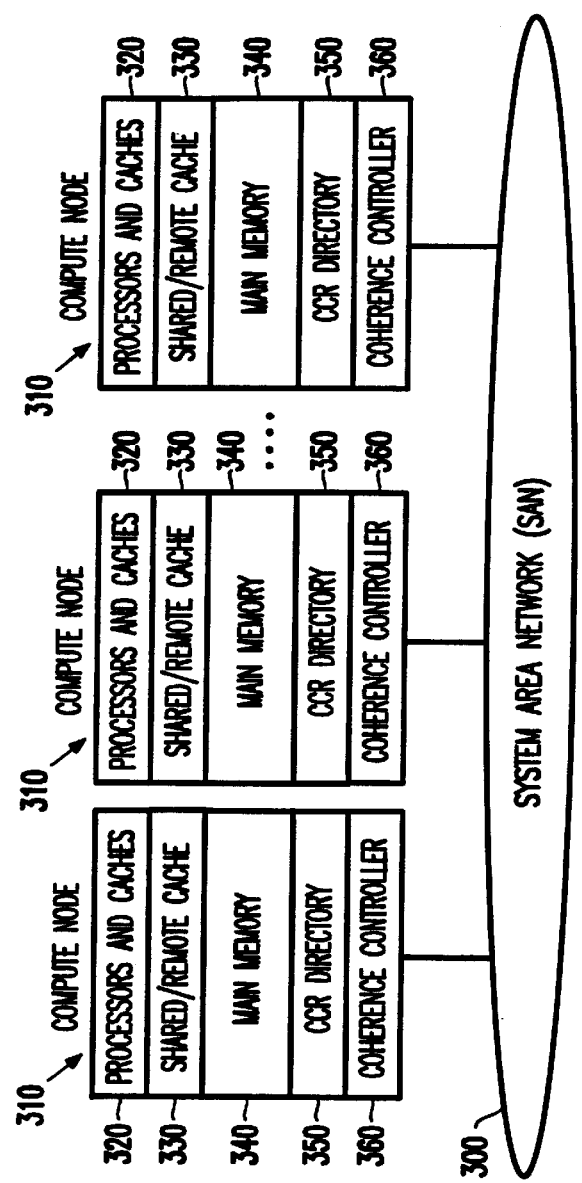

COMPLETE AND CONCISE REMOTE (CCR) DIRECTORY

BACKGROUND OF THE INVENTION

1. Field of the Invention

The present invention relates to efficient processing of memory requests in cache-based systems. More specifically, the present invention relates to improved processing speed of memory requests (or other coherence requests) in the coherence controller of shared memory multiprocessor servers or in the cache controller of uniprocessor systems.

2. Description of the Related Art

Conventional computer systems often include on-chip or off-chip cache memories which are used with processors to speed up accesses to system memory. In a shared memory multiprocessor system, more than one processor can store a copy of the same memory location(s) (or line(s)) in its cache memory. A cache coherence mechanism is required to maintain consistency among the multiple cached copies of the same memory line. Furthermore, a network protocol such as a Sealable Coherent Interface (SCI) is often used in conjunction with the conventional systems.

In small, bus-based multiprocessor systems, the coherence mechanism is usually implemented as a part of the cache controllers using a snoopy coherence protocol. The snoopy protocol cannot be used in large systems that are connected through an interconnection network due to the lack of a bus. As a result, these systems use a directory-based protocol to maintain cache coherence. The directories are associated with the main memory and maintain the state information of the various caches on the memory lines. This state information includes data indicating which cache(s) has a copy of the line or whether the line has been modified in a cache(s).

Conventionally, these directories are organized as "full map" memory directories where the state information on every single memory line is stored by mapping each memory line to a unique location in the directory. FIG. 1 is a representation of a "full map" arrangement. A memory directory 100 is provided for main memory 120. In this implementation, entries 140 of the main directory 100 include state information for each memory line 160 of main memory 120. That is, there is a one to one (state) mapping between a main memory line 160 and a memory directory entry 140 (i.e., there is full mapping).

As a result, when the size of main memory 120 increases, the memory directory 100 size also increases. If the memory directory 100 is implemented as relatively fast static RAM, tracking the size of main memory 120 becomes prohibitively expensive. If the memory directory 100 is implemented using slow static RAMs or DRAMs, higher cost is avoided. However, a penalty is incurred in overall system performance due to the slower static RAM or DRAM chips. In fact, each directory access in such implementations will take approximately 5–20 controller cycles to complete.

In order to address this problem, "sparse" memory directories have been conventionally used in place of the ("full map") memory directories. FIG. 2 is a representation of a sparse directory arrangement. A sparse directory 200 is smaller in size than the memory director 100 of FIG. 1 and is organized as a subset of the memory directory 100. The sparse directory 200 includes state information entries 240 for only a subset of the memory lines 260 of main memory 220. That is, multiple memory lines are mapped to a location in the sparse directory 200. Thus, due to its smaller size, a sparse directory 200 can be implemented in an economical fashion using fast static RAMs.

However, when there is contention among memory lines 260 for the same sparse directory entry field 240, the state information of one of the lines 260 must be replaced. There is no backup state information in the sparse directory arrangement. Therefore, when a line 260 is replaced from the sparse directory 200, all the caches in the overall system having a copy of that line must be asked to invalidate their copies. This incomplete directory information leads to both coherence protocol complexity and performance loss.

Thus, there is a need for a system which improves coherence/caching efficiency without adversely affecting overall system performance and maintains a relatively simple coherence protocol environment.

SUMMARY OF THE INVENTION

It is, therefore, an object of the present invention to provide a structure and method for a system for maintaining coherence of cache lines in a shared memory multiplexor system comprising a system area network and a plurality of compute nodes connected to the system area network. Each of the compute nodes includes a local main memory, a local shared cache and a local coherence controller. Compute nodes external to a given compute node are defined as "external" shared caches. The coherence controller includes shadow directories, each corresponding to one of the external shared caches. Each of the shadow directories includes state information of the local main memory cached in the external shared caches.

The shadow directories include only state information of the local main memory cached in the external shared caches. Each of the shadow directories includes a plurality of sets, each of the sets includes a plurality of entries and each of the entries is a memory address of the local main memory. Furthermore, each entry includes tag bits and state bits such as a presence bit and a modified bit. The presence bit indicates whether a line of the local main memory is stored in an external shared cache and the modified bit indicates whether the line of the local main memory is modified in the external cache.

By keeping information on the exact number of remotely cached lines, the CCR directory provides a dynamic fall map directory of presently shared lines, but only uses the memory of a sparse directory. Consequently, the CCR directory has all the advantages of a fall map directory. In contrast, a conventional sparse directory keeps the state information only on a subset of the memory lines that could have been remotely cached in a full map directory scheme, which leads to inferior performance and a more complex protocol when compared to a conventional full map directory.

BRIEF DESCRIPTION OF THE DRAWINGS

The foregoing and other objects, aspects and advantages will be better understood from the following detailed description of preferred embodiments of the invention with reference to the drawings, in which:

FIG. 1 is a schematic diagram of a full map memory directory structure;

FIG. 2 is a schematic diagram of a sparse directory memory structure;

FIG. 3 is a schematic diagram of compute nodes connected to a system area network.

DETAILED DESCRIPTION OF PREFERRED EMBODIMENTS OF THE INVENTION

Figure 4:
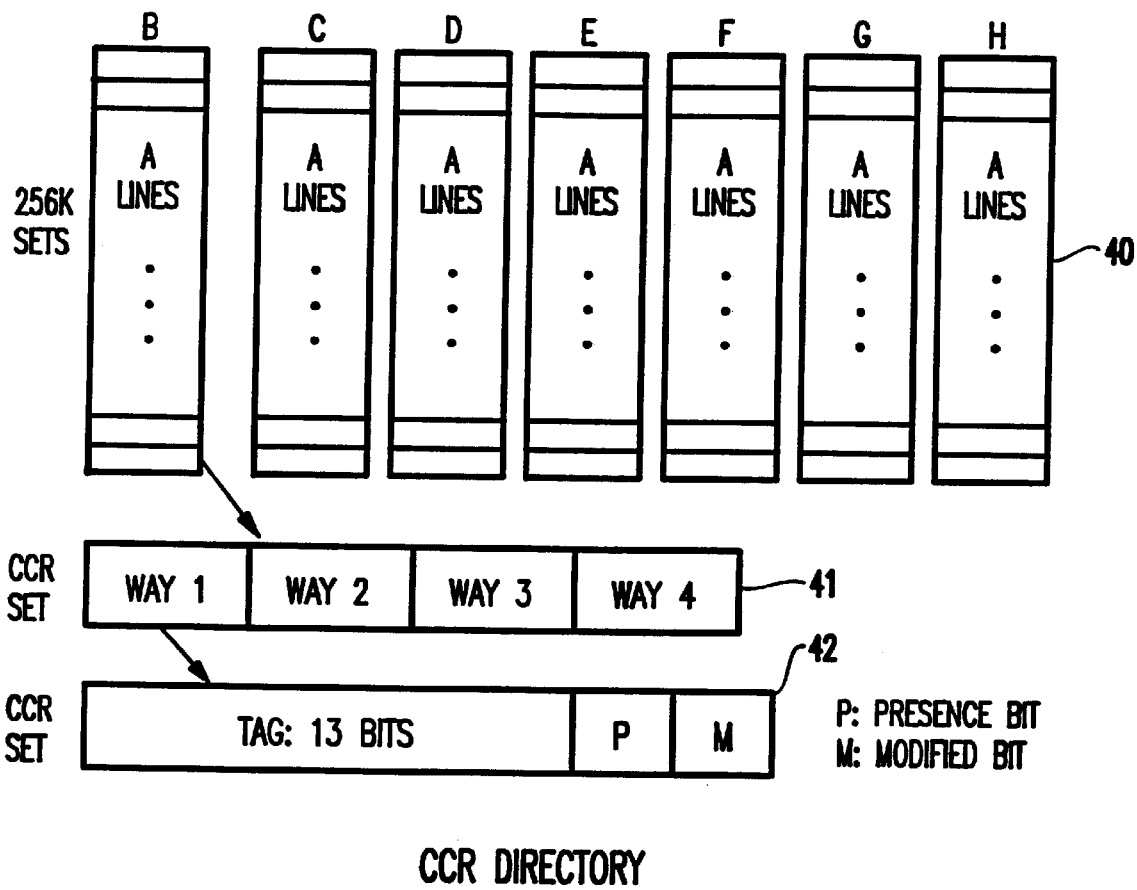
FIG. 4 is a schematic diagram of a CCR directory.

Disclosed herein is a new directory structure called a Complete and Concise Remote (CCR) directory. The CCR preserves the performance advantage of a full map directory while requiring as little space as a sparse directory. The CCR directory keeps state information only on the memory lines that are currently cached in a remote node (as opposed to all memory lines in case of full map directory). As a result, the CCR directory size is proportional to the size of the caches in the system, instead of the total memory size, and is, therefore, much less expensive than the full map directory.

However, the CCR directory keeps the exact amount of information necessary to maintaining coherence. Thus, the CCR directory never has to force any invalidations and therefore does not present the disadvantages of a sparse directory.

FIG. 3 depicts a multiprocessor system environment in which the CCR directory 350 of the pre sent invention can be implemented. A coherence controller 360 is responsible for maintaining coherence among the caches in the compute node 310.

The compute nodes 310 exist on a system area network (SAN) 300. Each compute node 310 includes one or more processors with associated caches 320, one or more shared/remote caches 330, one or more main memory modules 340, at least one CCR directory 350, at least one coherence controller 360 and several I/O devices (not shown). One skilled in the art will appreciate that memory for a compute node can be located in separate modules independent of the compute node. In that case, the coherence controller 360 and the CCR directory 350 can be disposed with the memory 340 or the processor 320.

The Complete and Concise Remote (CCR) directory 350 keeps state information on the memory lines belonging to the local home memory that are cached in remote nodes. This is done by keeping a shadow of each shared cache directory or remote cache directory 330 in the system (except for the shared or remote cache(s) in the local node) in the local node's CCR directory 350.

For example, the CCR directory could be implemented in a 64-way system using 8-way nodes per coherence controller which would allow seven shadow directories B–H in each coherence controller 360, as shown in FIG. 4. More specifically, FIG. 4 shows the organization of the CCR directory 360 for a given compute node 310 configuration which, in this example, is defined as compute node A.

In this example, the shared cache or the remote cache 330 in each compute node 310 is a 64MB, 4-way set associative with 64 byte lines. Therefore, each shared or remote cache has 256K shadow directory sets 41. Shadows directories B–H in node A's CCR directory therefore contain 256K sets, each set 41 containing state bits for four cache lines.

Even though a shadow directory 40 has enough space to keep the state information on all the lines in the remote cache it represents, it only keeps state information on the lines in the remote cache that belong to the local home memory (e.g., node A). For example, in FIG. 4, the shadow directory C contains the state bits for the lines belonging to home memory A that are presently in remote cache 330 in node C. But the lines in the remote cache 330 in node C belonging to memories 340 for nodes C through H are not represented in the shadow directory 40 of node C in the CCR directory 350 of node A.

In order to maintain an exact shadow of the remote caches 330, the CCR directory 350 needs the remote cache controller 360 to inform the home coherence controller 360 (e.g., A's coherence controller 360, in this example) containing the shadow B–H when the remote cache 330 evicts a line corresponding to that home node's memory 340. Since the degree of associativity of the shadow directory 40 in the CCR directory 350 is the same as the degree of associativity of the corresponding remote cache 330, and the CCR directory 350 is informed about the evictions from the remote cache 330, it is guaranteed that a CCR directory set 41 in the shadow directory 40 will always have a slot available when the remote cache needs to allocate a new line in that set 41. In other words, since each CCR directory 330 includes a dedicated shadow cache for each remote cache 330, a directory entry is never evicted from the CCR shadow directory 40 unless the line is being evicted in the corresponding remote cache.

FIG. 4 also illustrates the details of the address fields for accessing a CCR directory 350, assuming a 40-bit system wide physical address. Each entry 42 in a shadow 40 keeps a 14-bit tag and two state bits. The presence bit P tells if the line is present in the corresponding remote cache and the modified bit M tells if the line is modified in that cache. The P bit in all the CCR directory entries is initialized to 0 at system reset.

The states of a line in the corresponding remote cache interpreted from the P and M bits are shown in the table in FIG. 4. As would be apparent to one ordinarily skilled in the art given this disclosure, the foregoing can be modified to accommodate any sized system.

By keeping the information on the exact number of remotely cached lines, the CCR directory 350 provides a dynamic full map directory of presently shared lines, but only uses the memory of a conventional sparse directory. Consequently, the CCR directory has all the advantages of a full map directory. In contrast, a conventional sparse directory keeps the state information only on a subset of the memory lines that could have been remotely cached in a full map directory scheme, which leads to inferior performance and a more complex protocol when compared to a full map directory.

While it is possible to modify the original sparse directory scheme to keep information equivalent to the CCR directory;, substantial problems exist with such an enhanced sparse directory. Such an enhanced sparse directory would receive the evict information from the remote caches and would have sufficient space to shadow the remote caches. However, such an enhanced sparse directory would have to have an associativity of n*w in a system with n remote caches which are w-way set associative, and would need a huge multiplexor to obtain the presence bit vector when there is a hit. On the other hand, the inventive CCR directory has n number of w-way shadows that would need small multiplexors to get the directory information. Gathering the presence bit information from the n possible hits is a simple logic operation. Thus the CCR directory would avoid the extra latency penalty of a large multiplexor of such an enhanced sparse directory.

While the invention has been described in terms of preferred embodiments, those skilled in the art will recognize that the invention can be practiced with modification within the spirit and scope of the appended claims.

What is claimed is:

1. A system for maintaining coherence of cache lines in a shared memory multiplexor system comprising:

a system area network; and a plurality of compute nodes connected to said system area network, wherein each of said compute nodes includes a main memory, a shared cache and a coherence controller, wherein said coherence controller includes shadow directories, each corresponding to shared caches of other compute nodes connected to said system area network, wherein each of said shadow directories includes only state information of said main memory cached in said shared caches of said other compute nodes, wherein said system does not require a network protocol using a sealable coherent interface.

2. The system in claim 1, wherein each of said shadow directories includes a plurality of sets, each of said sets including a plurality of entries, each of said entries comprising a memory address of said main memory.

3. The system in claim 2, wherein each entry includes tag bits and state bits.

4. The system in claim 1, wherein said coherence controller maintains a dynamic full map directory of shared lines in said main memory.

5. A coherence controller for maintaining coherence of cache lines in a shared memory multiplexor system that includes a system area network and a plurality of compute nodes connected to said system area network, wherein each of said compute nodes includes a main memory, a shared cache and said coherence controller, said coherence controller comprising:

shadow directories, each corresponding to shared caches of other compute nodes, wherein each of said shadow directories includes only state information of said main memory cached in said shared caches of said other compute nodes, wherein said system area network does not require a network protocol using a sealable coherent interface.

6. The coherence controller in claim 5, wherein each of said shadow directories includes a plurality of sets, each of said sets including a plurality of entries, each of said entries comprising a memory address of said main memory.

7. The coherence controller in claim 6, wherein each entry includes tag bits and state bits.

8. The coherence controller in claim 5, wherein said coherence controller maintains a dynamic full map directory of shared lines in said main memory.

9. A method for maintaining coherence of cache lines in a shared memory multiplexor system that includes a system area network and a plurality of compute nodes connected to said system area network, wherein each of said compute nodes includes a main memory, a shared cache and a coherence controller, said method comprising:

maintaining shadow directories in said coherence controller, each of said shadow directories corresponding to shared caches of other compute nodes; and maintaining state information of said main memory cached in said shared caches in corresponding ones of said shadow directories of said other compute nodes;

wherein said maintaining of said state information maintains only state information of said main memory cached in said shared caches of said other compute nodes, wherein said system area network does not require a network protocol using a sealable coherent interface.

10. The method in claim 9, wherein said maintaining of said shadow directories includes maintaining a plurality of sets, each of said sets including a plurality of entries, each of said entries comprising a memory address of said main memory.

11. The method in claim 10, wherein each entry includes tag bits and state bits.

12. The method in claim 9, wherein said maintaining of said shadow directories in said coherence controller maintains a dynamic full map directory of shared lines in said main memory.

13. A program storage device readable by machine, tangibly embodying a program of instructions executable by said machine to perform method steps for maintaining coherence of cache lines in a shared memory multiplexor system that includes a system area network and a plurality of compute nodes connected to said system area network, wherein each of said compute nodes includes a main memory, a shared cache and a coherence controller, said method comprising:

maintaining shadow directories in said coherence controller, each of said shadow directories corresponding to shared caches of other compute nodes; and maintaining state information of said main memory cached in said shared caches in corresponding ones of said shadow directories of said other compute nodes;

wherein said maintaining of said state information maintains only state information of said main memory cached in said shared caches of said other compute nodes, wherein said system area network does not require a network protocol using a sealable coherent interface.

14. The program storage device in claim 13, wherein said maintaining of said shadow directories includes maintaining a plurality of sets, each of said sets including a plurality of entries, each of said entries comprising a memory address of said main memory.

15. The program storage device in claim 14, wherein each entry includes tag bits and state bits.

16. The program storage device in claim 13, wherein said maintaining of said shadow directories in said coherence controller maintains a dynamic full map directory of shared lines in said main memory.

* * * * *